(12) United States Patent
Pitscheneder et al.

(10) Patent No.: US 7,261,539 B2
(45) Date of Patent: Aug. 28, 2007

(54) INJECTION MOLDING MACHINE

(75) Inventors: Walther Pitscheneder, Sierning (AT); Helmut Naderhirn, Perg (AT)

(73) Assignee: Engel Austria GmbH, Schwertberg (AT)

( * ) Notice: Subject to any disclaimer, the term of this patent is extended or adjusted under 35 U.S.C. 154(b) by 356 days.

(21) Appl. No.: 10/936,049

(22) Filed: Sep. 8, 2004

(65) Prior Publication Data
US 2005/0053684 A1    Mar. 10, 2005

(30) Foreign Application Priority Data
Sep. 10, 2003  (AT)  .............................. GM620/2003

(51) Int. Cl.
*B29C 45/77*  (2006.01)

(52) U.S. Cl. ..................... 425/143; 264/40.6; 425/144
(58) Field of Classification Search ................ 425/144, 425/143; 264/40.6
See application file for complete search history.

(56) References Cited

U.S. PATENT DOCUMENTS 5,356,575 A * 10/1994 Krosse et al. ............... 264/40.6
7,014,443 B2 * 3/2006 Hinzpeter et al. ........... 425/167

* cited by examiner

*Primary Examiner*—Tim Heitbrink
(74) *Attorney, Agent, or Firm*—Notaro & Michalos PC

(57) ABSTRACT

Injection molding machine with a mold that can be opened and closed, into the mold cavity of which a fluid molding compound, preferably plastic, can be injected, and with at least one reading device (12) for at least one transponder (13) arranged in the mold cavity (4).

28 Claims, 5 Drawing Sheets

INJECTION MOLDING MACHINE

Figure 1:
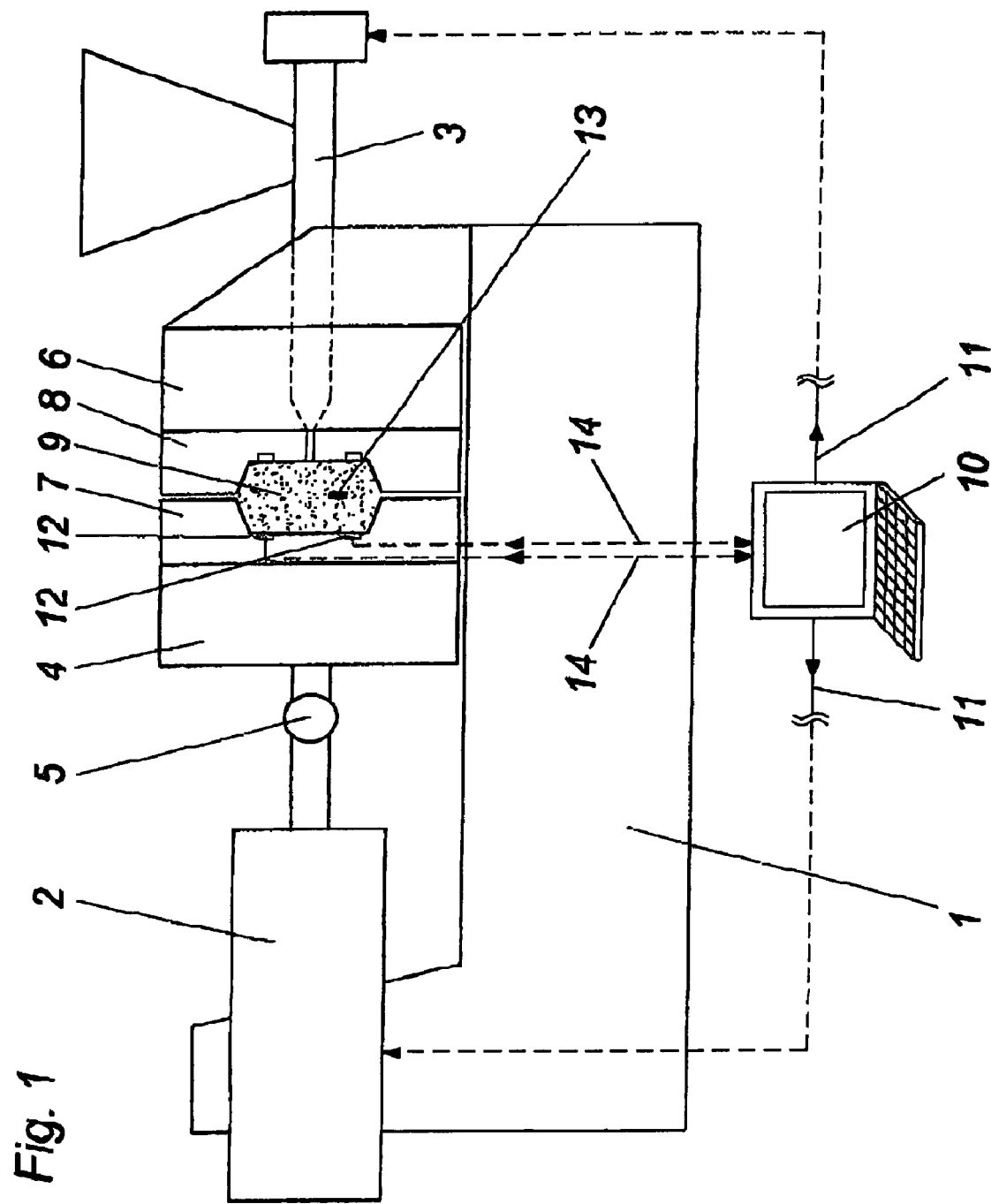

The invention relates to an injection molding machine with a mold that can be opened and closed, into the mold cavity of which a fluid molding compound, preferably plastic, can be injected.

According to a first variant of the invention at least one reading device for at least one transponder arranged in the mold cavity is provided.

Transponders are known per so. They serve to create a contactless communication between the, in most cases miniaturized, transponder and a reading device, data transport being possible in both directions. Thus generally speaking data from the transponder can be read out and frequently data can also be written into a memory of the transponder. There are active transponders which are provided with their own energy source, for example a battery. Increasing use is also being made of passive transponders which obtain the supply energy for the electronic circuits at the transponder from the interrogating electromagnetic field of the reading device. To this end these passive transponders frequently also have a resonance capacitor in addition to a receiving antenna or coil.

The use according to the invention of a reading device for a transponder in the mold cavity of an injection molding machine permits numerous advantageous possible uses. For example it is possible to equip or combine the transponder with sensors (e.g. for pressure or temperature). The reading device then allows, during the injection molding process, the transportation of relevant process data from out of the mold cavity by means of the transponder. These data can be used for example to optimize the injection molding process, it also being possible that an electronic control device which is present as standard in modern injection molding machines automatically evaluates these data and adjusts or regulates injection molding parameters depending on them.

There is also the possibility to write data on the transponder while it is in the mold cavity. These data can come from the named sensors (e.g. for pressure or temperature) in order to also give the article the history of its manufacturing parameters via the transponder cast in with it. However, there is also the possibility to write in, during the manufacturing process, further external data such as article-identification data or else further data relating to the manufacturing process, the manufacturing time, the date of manufacture, etc.

In order to guarantee a good communication between the transponder and the reading device, above all during the preferred use of a RFID system, the receiving unit (antenna) of the reading device can be arranged in the inside wall of the mold facing the mold cavity. In order to avoid or reduce an unwanted screening effect with the customary metal molds, a part of the mold wall can consist of a dielectric, for example ceramic or ferrite. It is also conceivable, in order to improve reception, to replace the antenna that is frequently integrated on a chip of the reading device with a wideband external antenna or coil.

A further aspect of the invention concerns the problem of the position-accurate placement of the transponder inside the manufactured injection molding, especially if the transponder is to be housed, not at the surface of the injection molding but enclosed on all sides by the molding compound in its inside.

Such a variant of the injection molding machine is characterized by a device for the introduction of at least one transponder into the fluid molding compound preferably at a point at a distance from the inside wall of the mold cavity, the transponder preferably being able to be enclosed on all sides by the fluid molding compound.

There are several realization possibilities for this, for example the holding mans for the transponder can be cast in with it. However, it is also possible to withdraw these during the manufacturing process after positioning of the transponder and partial solidification of the molding compound. Finally there is also the possibility of including the transponder in the optionally partly pre-solidified molding compound.

There is the possibility, especially if the final position of the transponder in the finished article is not so important, of introducing it into the mold together with the fluid molding compound, for example via the plasticizing screw.

It is also conceivable to feed the transponder with the raw material (plastics granules).

There is also the possibility to jointly introduce the transponder already distributed in the raw material. These transponders can then also be used to identify the raw material batches. If this identification is exclusively desired, it is sufficient to provide one transponder per batch and arrange it in or at the transport container for the raw material.

Finally, it is also possible to arrange, outside the mold cavity, at least one transponder at a transport container (tray) for the injection moldings removed from the mold cavity, several spaced-apart reading devices then being advantageously provided so as to be able to track the path of these transport containers.

Further advantages and details of the invention are explained in more detail with the help of the following description of figures.

Figure 2:
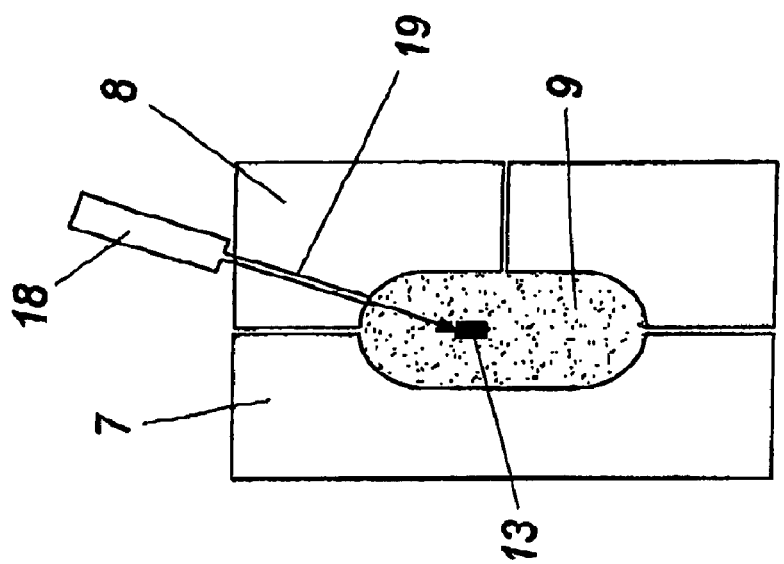
Figure 3:
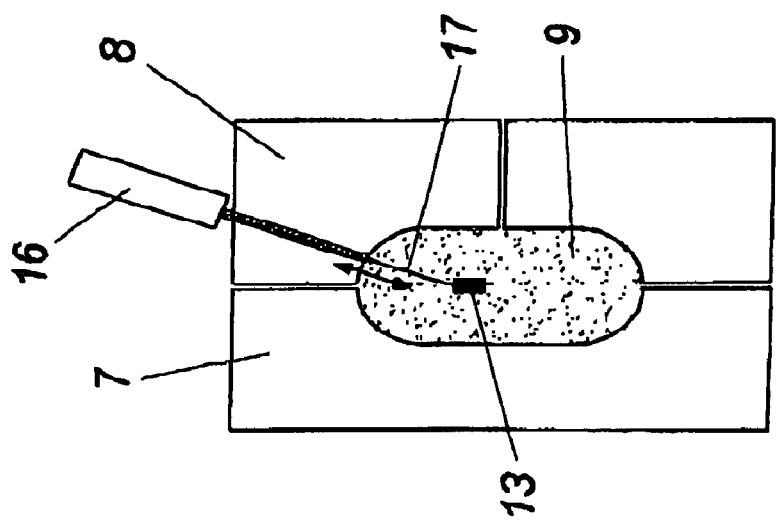
Figure 4:
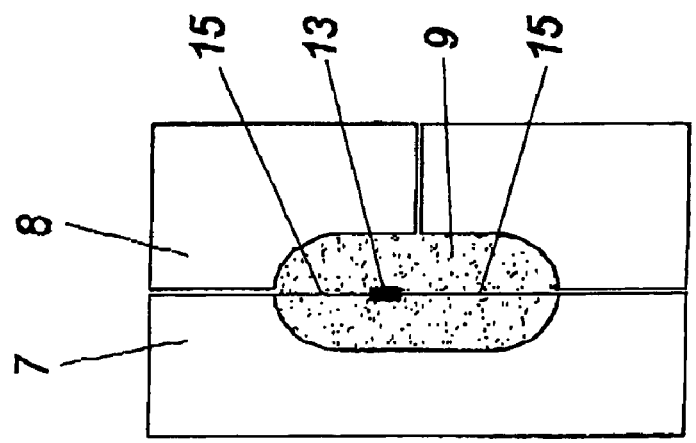
Figure 5:
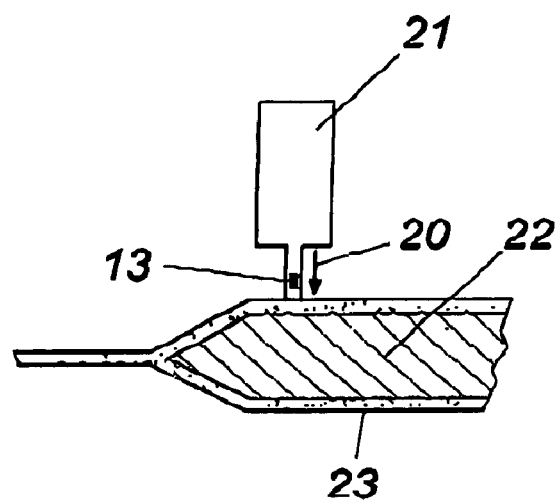
Figure 6:
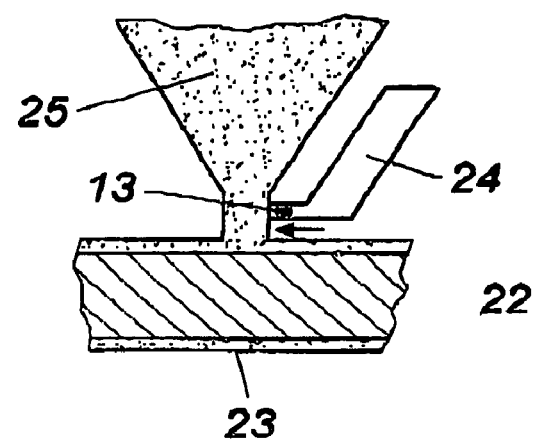
Figure 7:
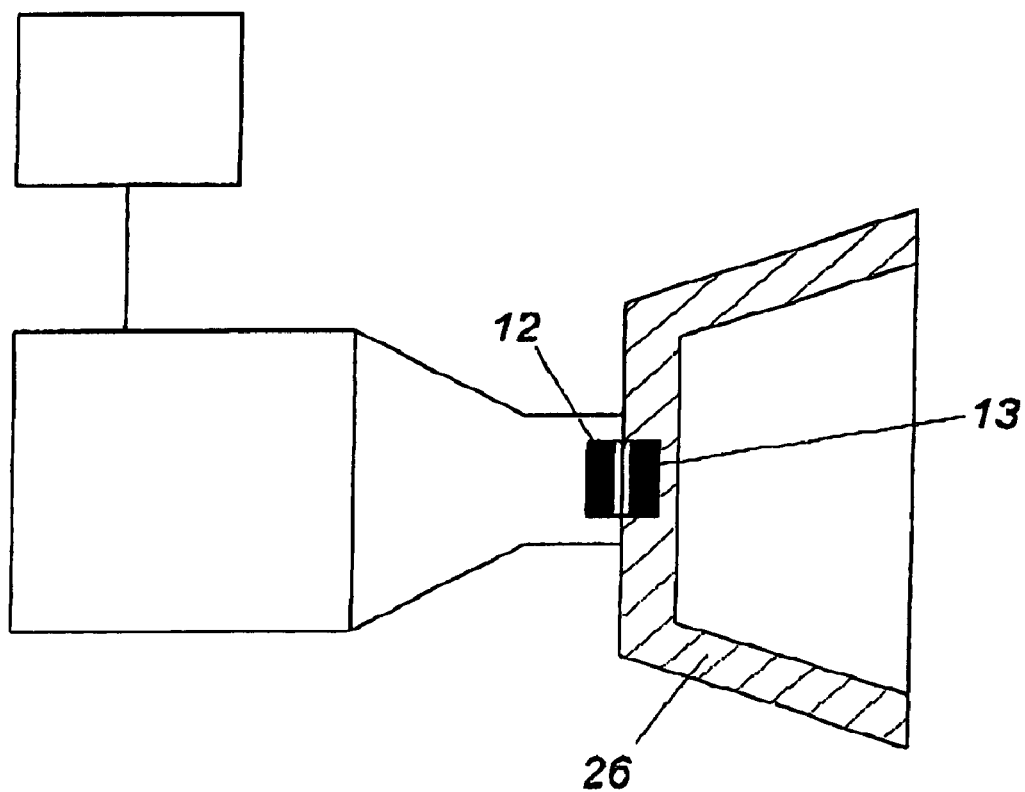
Figure 9:
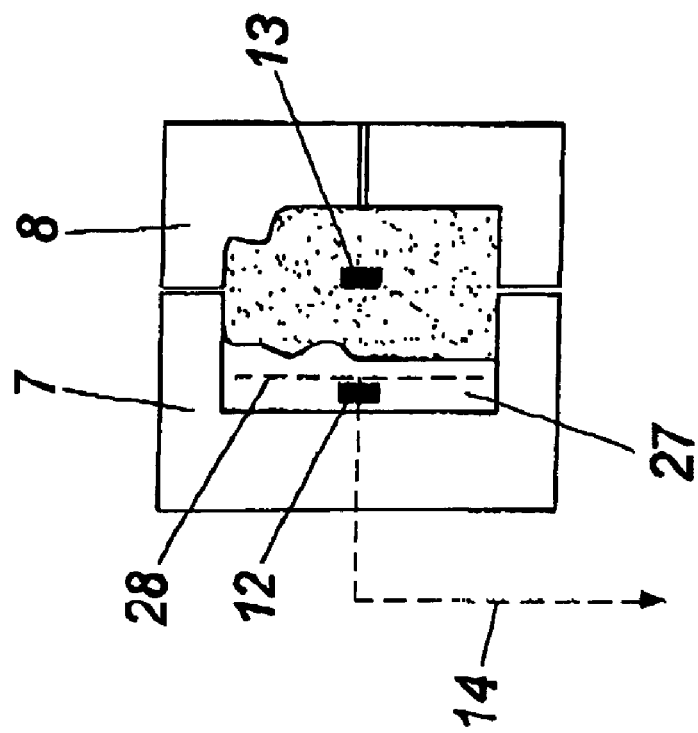
Figure 8:
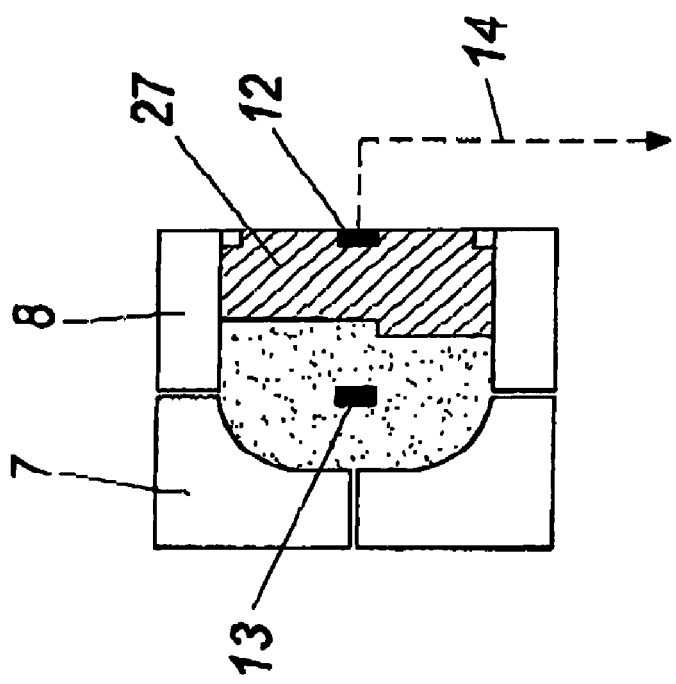
Figure 10:
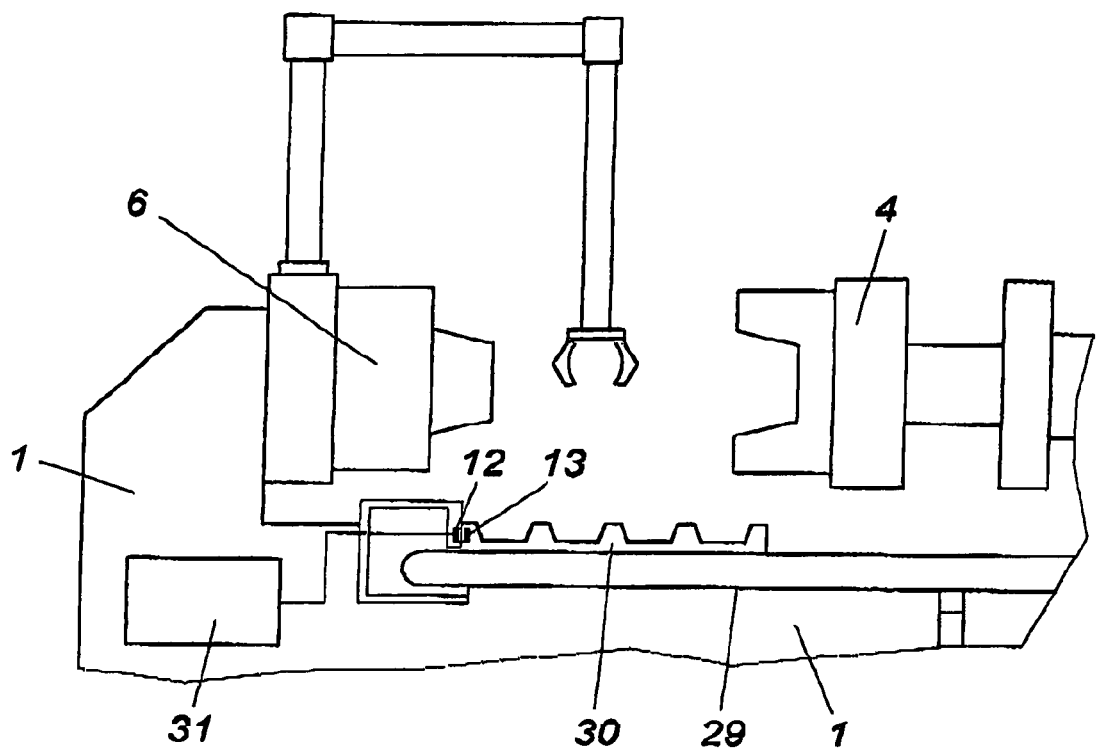
Figure 11:
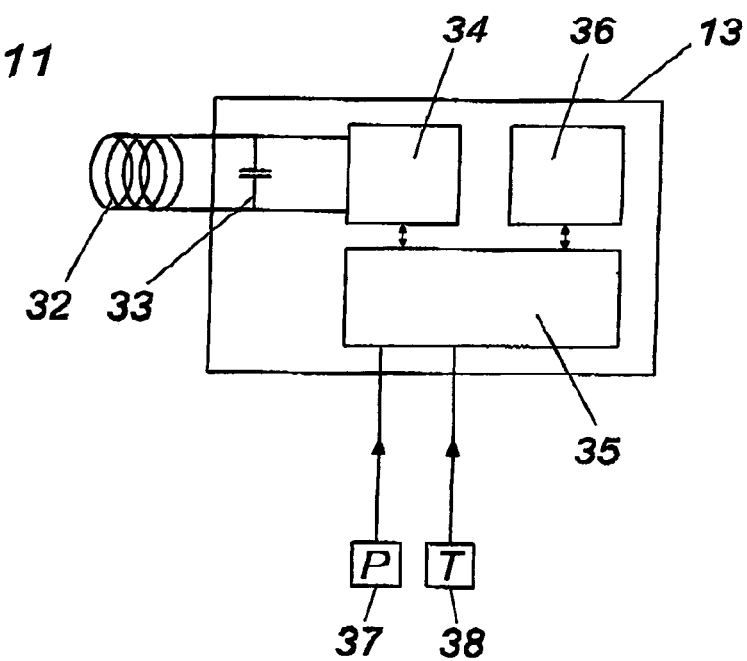

There are shown in:

FIG. 1 a schematic side view of an embodiment of an injection molding machine according to the invention, FIGS. 2 to 4 variants for the introduction, in a secure position, of the transponder into the molding compound in the mold cavity, FIGS. 5 and 6 variants in which the transponder is co-injected, FIG. 7 an embodiment of a reading device situated outside the molding compound for a manufactured article with transponder, FIGS. 8 and 9 embodiments for the achievement of an improved reception or of an improved bidirectional communication between transponder and reading device, FIG. 10 a side view of an embodiment of a further variant of the invention, FIG. 11 the schematic structure of an embodiment of a suitable passive transponder.

FIG. 1 shows in a schematic representation an injection machine without tie bars, having a machine frame 1, a closure mechanism 2 and an injection unit 3. The moving platen 4 is moved via a joint 5 by the closure mechanism 2. The stationary platen 6 is fixedly connected to the machine frame 1. The moving platen 4 carries the mold half 7 that is on the left in FIG. 1. The stationary platen carries the right mold half 8. The two mold halves 7 and 8 together form the mold that can be opened and closed which in the closed state delimits at least one mold cavity 9 into which a fluid molding compound, preferably plastic, can be injected via the injection unit. After the curing of this molding compound and the opening of the mold via the closure device 2, the finished injection molding can be removed.

The components of the injection machine are controlled via an electronic control device 10, the control lines 11 being only schematically represented, because this is basically very well known in the state of the art. According to the invention at least one reading device (in FIG. 1 there are two reading devices 12) is provided for at least one transponder 13 arranged in the mold cavity 9. The reading devices 12 are arranged at the inside wall of the mold. They can, as FIGS. 8 and 9 will also show in the following, be at least partly embedded in a dielectric in order to ensure a good, contactless communication between transponder 13 and reading device 12.

The transponder can be in communication with pressure or temperature sensors or have these in integrated form and thus, during the manufacturing process, relay to the reading device 12 process data which then travel via lines 14 to the electronic control device. There they can be graphically represented and/or stored. However, it is also possible that these data are actively included in a regulation process in order to change the parameters of the current injection molding cycle or following injection molding cycles. It is also possible that the communication between transponder 13 and reading device 12 is bidirectional, that data are thus also transmitted via the receiving unit, which then also operates as a transmitting unit, into a memory of the transponder. These can be for example manufacturing-specific data such as manufacturing time or batch number.

After manufacture, the transponder 13 remains in the article and subsequently also allows the reading-out of the data located therein.

FIG. 2 shows an embodiment with a device for holding the transponder at a predefined position inside the mold cavity and thus also inside the manufactured injection molding. In the present case this device consists of thin wires 15. These are cast in with the transponder and remain in the injection molding. In principle, mechanical holding means other than wires are of course also perfectly conceivable and possible.

In the case of the version represented in FIG. 3, the device 16 for the introduction of the transponder 13 contains a movable holding part 17. The transponder is held securely via this when the liquid molding compound is introduced and can then be withdrawn at a suitable moment. The channel that is left initially can be easily closed by application of the customary secondary pressure. The transponder 13 then remains in a predefined position in the molding compound and ultimately in the article, without additional holding parts remaining therein.

FIG. 4 shows an embodiment in which the transponder 13 is injected via a device 18 and a channel 19 into the as yet not completely cured fluid molding compound. It is also thus possible to convey the transponder to a point in the inside of the article.

If the position of the transponder 13 in the article is not so important, there is a possibility of bringing the transponder into the mold cavity by introducing it with the fluid molding compound. Examples of suitable devices for this purpose are shown in FIGS. 5 and 6. In the case of the embodiment shown in FIG. 5, the transponder 13 is introduced into the plasticizing screw 22 in the direction shown by the arrow 20 via an introduction device 21 close to the front end of the plasticizing screw 22 and then injected with the liquid molding compound. To this end, it is particularly advantageous to house the transponder chip in a shear-stable casing.

In the case of the embodiment represented in FIG. 6 the transponder 13 is fed from a device 14 into the lower area of the hopper 25 for the raw material food.

FIG. 7 shows an embodiment in which a reading device 12 outside the mold reads a transponder 13 in a finished manufactured injection molding 26, for example in order to identify the injection molding or read out other data from the transponder.

FIGS. 8 and 9 show embodiments in which in particular when using a RFID system which uses radio waves, the reception of the reading device 12 or generally the bidirectional communication between reading device 12 and transponder 13 is improved.

In the case of the embodiment represented in FIG. 8, to this end a part of the otherwise customary metal mold half 8 is developed from a non- or only poorly-conducting dielectric 27. For example, the dielectric can consist of ceramic or another dimensionally stable material. Another possibility of improving reception is shown in FIG. 9, in which the reading device has an external antenna 28 or receiving coil.

In the case of the embodiment represented in FIG. 10, a transponder 13 is secured to a container 30 (tray), movable via a conveyor belt 29, for the manufactured plastic articles. In FIG. 10 there is represented by way of example a reading device 12 which can also write data into the transponder. Thus it is possible to also provide via the transport container 30 data relating to the manufactured articles which can be used during fiber treatment logistics. In general, several further reading devices 12, which are not represented in FIG. 10, are also provided to this end. The reading device 12 is controlled in customary manner by an electronic control device 31 which can be part of the overall machine control system. As was already mentioned at the outset, different types of transponder can be used in principle.

FIG. 11 shows an example of a passive transponder 13 with an antenna 32. This can be developed as an air coil. However, it can also be integrated on a transponder chip or otherwise installed. Furthermore, a resonance capacitor 33 is provided. The transponder 13 can also be in communication with sensors 37 for pressure and 38 for temperature. The sensor data can either be transmitted direct to the reading device and/or stored in the memory 36. It is also possible to house the sensors 37 and 38 on the chip of the transponder or a common carrier. It is also perfectly conceivable and possible to record physical variables other than pressure and temperature.

The schematically represented HF pan 34 comprises a rectifier and ensures the power supply of the supplier. It also modulates or demodulates the signals in order to make possible a data transmission between the reading device that is not represented and the control logic. This control logic comprises, in a manner known per so, a clock generator and a sequence and memory control system as well as, optionally, an encryption logic. The control logic 35 is in communication with a memory 36, for example an EEPROM.

Such a passive transponder obtains the energy from the field of the reading device. Preferably, however, active transponders can also be used in which batteries, for example flexible flat cells or button cells, ensure the power supply.

The invention claimed is:

1. Injection molding machine with a mold that can be opened and closed, the mold having a mold caviity into which mold cavity a fluid molding compound can be injected, characterized by at least one reading device for at least one transponder arranged in the mold cavity, wherein data transport between said reading device and said transponder occurs in both directions in a contactless manner.

2. Injection molding machine according to claim 1, characterized in that the fluid molding compound is a plastic.

3. Injection molding machine according to claim 1, characterized in that a receiving unit of the reading device is arranged in the inside wall of the mold facing the mold cavity.

4. Injection molding machine according to claim 1, characterized in that at least a part of the mold wall consists of a dielectric, the reading device having a receiving unit and the receiving unit of the reading device is arranged in the area of the dielectric.

5. Injection molding machine according to claim 4, characterized in that the dielectric is a ceramic or ferrite.

6. Injection molding machine according to claim 1, characterized in that the reading device is arranged partly on a carrier, and the antenna of the reading device is arranged outside the carrier of same at or in the mold.

7. Injection molding machine according to claim 6, characterized in that the carrier is a chip.

8. Injection molding machine according to claim 1, characterized in that the reading device and the transponder are parts of a RFID system.

9. Injection molding machine according to claim 1, characterized in that the reading device is also developed as a writing device by means of which data can be transmitted to the transponder.

10. Injection molding machine according to claim 9, characterized in that the receiving unit is able to operate as a transmitting unit.

11. Injection molding machine according to claim 9, characterized in that the data can be transmitted to a memory of the transponder.

12. Injection molding machine according to claim 1, characterized in that in the mold cavity at least one sensor is arranged which is in communication with the transponder.

13. Injection molding machine according to claim 12, characterized in that the sensor is a pressure sensor or a temperature sensor.

14. Injection molding machine according to claim 12, characterized in what the at least one sensor is developed integrated in or at the transponder.

15. Injection molding machine, characterized by a device for the introduction or holding of at least one transponder into the liquid or in the fluid molding compound.

16. Injection molding machine according to claim 15, characterized in that the transponder can be introduced or held at a point at a distance from the inside wall of the mold cavity.

17. Injection molding machine according to claim 15, characterized in that the transponder is introduced or hold in a way that it is enclosed on all sides, by the fluid molding compound.

18. Injection molding machine according to claim 15, including mechanical holding means which are cast in with the transponder and remain with the transponder in the injection molding.

19. Injection molding machine according to claim 18, characterized in that the mechanical holding means comprise wires.

20. Injection molding machine according to claim 15, characterized in that the device for the introduction of at least one transponder has a movable holding part for the releasable holding of the transponder.

21. Injection molding machine according to claim 20, characterized in that the holding part is essentially able to be withdrawn completely into the wall of the mold.

22. Injection molding machine according to claim 15, characterized in that the device for the introduction of at least one transponder has a device for the injection of the transponder into the as yet not fully cured molding compound.

23. Injection molding machine, characterized by a device for the introduction of at least one transponder into the fluid molding compound at a point before this enters the mold cavity.

24. Injection molding machine according to claim 23, characterized by a device for the introduction of at least one transponder into the fluid molding compound in the area of the plasticizing screw of the injection unit or into the channel adjacent to it.

25. Injection molding machine according to claim 1, characterized by a device for the introduction of at least one transponder into the plastics granules before or at the entrance to the plasticizing cylinder.

26. Injection molding machine, characterized in that at least one transponder is provided in or at the transport containers for the raw material to be processed.

27. Injection molding machine, characterized in that, outside the mold cavity, at least one transponder is arranged at a transport container for the injection moldings removed from the mold cavity.

28. Injection molding machine according to claim 27, characterized in that two or more spaced-apart reading devices are provided for the reading of the transponders at the transport containers.

* * * * *